(12) United States Patent
Wuebker

(10) Patent No.: US 7,694,018 B2
(45) Date of Patent: Apr. 6, 2010

(54) METHOD AND SYSTEM FOR COMMUNICATION BETWEEN TWO DEVICES BY EDITING MACHINE SPECIFIC INFORMATION AT A PROXY SERVER

(75) Inventor: Carl L. Wuebker, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 939 days.

(21) Appl. No.: 10/300,112

(22) Filed: Nov. 19, 2002

(65) Prior Publication Data

US 2004/0098484 A1  May 20, 2004

(51) Int. Cl.
*G06F 15/173* (2006.01)
*G06F 15/16* (2006.01)

(52) U.S. Cl. .................... 709/245; 709/238; 709/246
(58) Field of Classification Search ............... 709/203, 709/227, 229
See application file for complete search history.

(56) References Cited

U.S. PATENT DOCUMENTS

| 6,038,233 | A * | 3/2000 | Hamamoto et al. | 370/401 |
| 6,118,784 | A * | 9/2000 | Tsuchiya et al. | 370/401 |
| 6,172,986 | B1 * | 1/2001 | Watanuki et al. | 370/466 |
| 6,253,326 | B1 * | 6/2001 | Lincke et al. | 726/12 |
| 6,311,215 | B1 * | 10/2001 | Bakshi et al. | 709/221 |
| 6,345,300 | B1 * | 2/2002 | Bakshi et al. | 709/229 |
| 6,604,143 | B1 * | 8/2003 | Nagar et al. | 709/229 |
| 6,934,763 | B2 * | 8/2005 | Kubota et al. | 709/245 |
| 6,963,982 | B1 * | 11/2005 | Brustoloni et al. | 726/15 |
| 7,047,561 | B1 * | 5/2006 | Lee | 726/12 |
| 7,085,270 | B2 * | 8/2006 | Inouchi et al. | 370/392 |
| 7,227,864 | B2 * | 6/2007 | Collins et al. | 370/392 |
| 7,349,348 | B1 * | 3/2008 | Johnson et al. | 370/254 |
| 2001/0044310 | A1 * | 11/2001 | Lincke | 455/456 |
| 2002/0010799 | A1 * | 1/2002 | Kubota et al. | 709/249 |
| 2002/0078135 | A1 * | 6/2002 | Venkatsubra | 709/202 |
| 2002/0163935 | A1 * | 11/2002 | Paatela et al. | 370/466 |
| 2003/0065791 | A1 * | 4/2003 | Garg et al. | 709/229 |
| 2003/0120810 | A1 * | 6/2003 | Ohta | 709/245 |
| 2004/0013130 | A1 * | 1/2004 | Blanchet et al. | 370/466 |
| 2004/0088425 | A1 * | 5/2004 | Rubinstein et al. | 709/230 |

* cited by examiner

*Primary Examiner*—Patrice Winder
*Assistant Examiner*—Azizul Choudhury

(57) ABSTRACT

A method for communicating between two devices through a proxy server, and a system for implementing the same. The method discloses a proxy server that is capable of receiving traffic at a proxy server from a first device and a second device. The second device services the first device. The method and proxy server allow for communication between the first and second devices by editing machine specific information in the traffic at the application layer so that traffic sent to the first and second devices appears to be from the proxy server. The traffic complies with a protocol operating at the application layer. Thereafter, the traffic that is edited is forwarded to the first and second devices appropriately.

22 Claims, 7 Drawing Sheets

METHOD AND SYSTEM FOR COMMUNICATION BETWEEN TWO DEVICES BY EDITING MACHINE SPECIFIC INFORMATION AT A PROXY SERVER

TECHNICAL FIELD

The present invention relates to the field of proxy servers, and more particularly to a method and system for using a proxy server to allow for communication between two devices that are unable to communicate directly through an application layer protocol.

BACKGROUND ART

Protocols allowing for communication between two electronic devices reside at the application layer (layer 7) of the International Organization for Standardization Open Systems Interconnection (ISO/OSI) reference model. The protocols are designed for a particular network architecture to allow for the transfer of message traffic between the two electronic devices.

Prior Art FIG. 1 is a block diagram illustrating a network 100 comprising a client device and a server device 120. The client 100 requests information from the server 120 through a communication channel 130 that couples the client 110 and the server 120 together. The client 110 and the server 120 can be located on any network, such as a local area network (LAN), a wide area network (WAN), through the Internet, etc. A client/server protocol implemented at the application layer (layer 7) of the ISO/OSI reference model is designed to facilitate the transfer of information between the client 110 and the server 120 once the communication channel 130 is established.

Without the firewall 150, the network 100 allows for direct communication between the client 110 and the server 120 through the communication channel 130. Unfortunately, once the network 100 in which the client device 110 and the server 120 use to communicate with each other is altered, the client/server protocol may fail to allow communication between the two devices, especially if the client/server protocol is not set up to recognize the use of proxy servers.

For example, if a firewall 150 is implemented within the network architecture 100 for security measures, communication may not be possible through the communication channel 130 via the application layer protocol. The firewall 150 secures a private network 160 by providing a gateway for information to pass through between a private network 160 and a public network 170. All message traffic is handled at the network layer (layer 3) of the ISO/OSI reference model, by the firewall 150. The firewall 150 inspects the packet header for incoming and outgoing message traffic against a set of rules set up in security tables. If the rules are not violated, then the message traffic will pass through the firewall 150.

In one implementation, the firewall restricts all message traffic coming into and going out from the private network 160. As illustrated in Prior Art FIG. 1, if the client 110 is located within a private network, and the server 120 is located within a public network 170, then there can be no direct communication between the two due to the implementation of the firewall 150.

The private network 160 can comprise a proxy server 180 with an outside LAN connection to allow for communication between electronic devices that are inside the firewall 150 with electronic devices that are outside of the firewall 150 and in the public network 170. As such, the proxy server 180 provides for an alternative pathway 190 to access devices outside the firewall 150.

However, the use of the proxy server in the prior art for communication between the client device 110 and the server 120 may not fully provide for communication between the client 110 and the server 120, especially when the client/server protocol is unaware of the use of a proxy server. Conventional proxy servers attempt to preserve currently implemented client/server protocols, and as such, changes are made at the network layer (level 3) of the ISO/OSI reference model. As a result, the client/server protocol expects to see only the client 110 and the server 120 referenced within the implementation of the client/server protocol, and will fail whenever a third party device intervenes, and is referenced, such as, a proxy server.

Therefore, prior art methods of implementing a proxy server to facilitate communication between two devices that could not communicate at the application layer through a client/server protocol were unable to facilitate the communication.

DISCLOSURE OF THE INVENTION

A method and system of communication through a proxy server is disclosed. Specifically, embodiments of the present invention disclose a method implementing a proxy server that is capable of receiving traffic at a proxy server from a first device and a second device. The second device services the first device. The method and proxy server allow for communication between the first and second devices by editing machine specific information in the traffic at the application layer so that traffic sent to the first and second devices appears to be from the proxy server. The traffic complies with a protocol operating at the application layer. Thereafter, the traffic that is edited is forwarded to the first and second devices appropriately.

BRIEF DESCRIPTION OF THE DRAWINGS

PRIOR ART

BEST MODES FOR CARRYING OUT THE INVENTION

Reference will now be made in detail to the preferred embodiments of the present invention, a method of allowing two electronic devices to communicate through a proxy server when the two devices are unable to communicate directly via an application level protocol. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for providing communication. In one embodiment, the computer system includes a processor coupled to a bus and memory storage coupled to the bus. The memory storage can be volatile or non-volatile and can include removable storage media. The computer can also include a display, provision for data input and output, etc.

Accordingly, the present invention discloses a method and system of communication through a proxy server. Specifically, embodiments of the present invention discloses a method for communicating between two devices that are unable to communicate directly via an application layer protocol, and a system for implementing the same. The method discloses a proxy server that is capable of receiving traffic at a proxy server from both a first device and a second device. Because the traffic is edited at the application layer, embodiments of the present invention are superior to previous techniques in the prior art that failed to account for machine specific information, and therefore would fail upon trying to provide communication through a proxy server between the two devices. More specifically, embodiments of the present invention are able to utilize current application layer protocols as a platform through a proxy server to allow for communication between two devices that could not directly communicate directly via the application layer protocol by editing machine specific information in the traffic so that traffic sent to the first and second devices appears to be from the proxy server.

Figure 1:
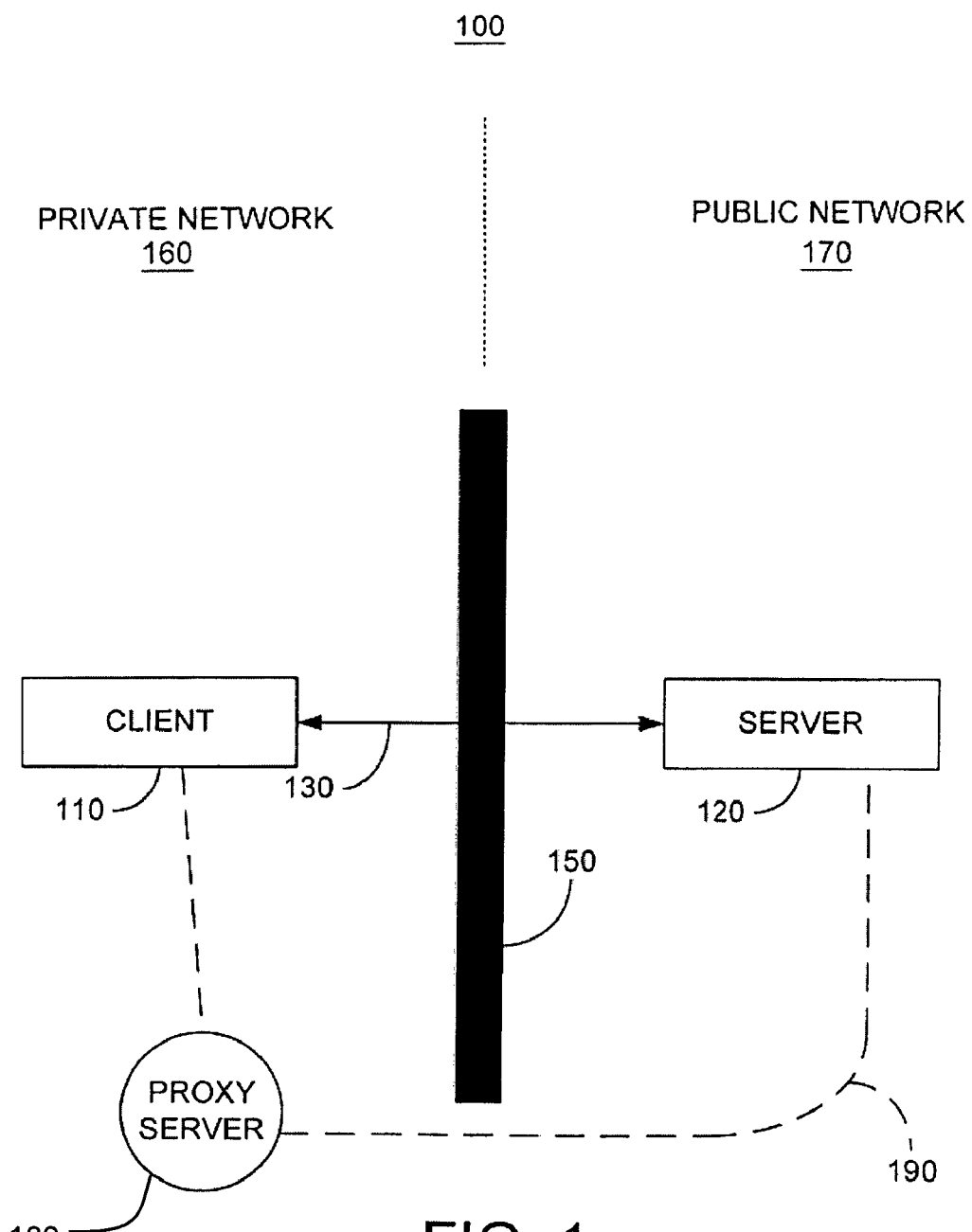
FIG. 1 is a block diagram of a network architecture that is unable to provide communication between a client and server through a firewall via an application layer client/server protocol.
Figure 2:
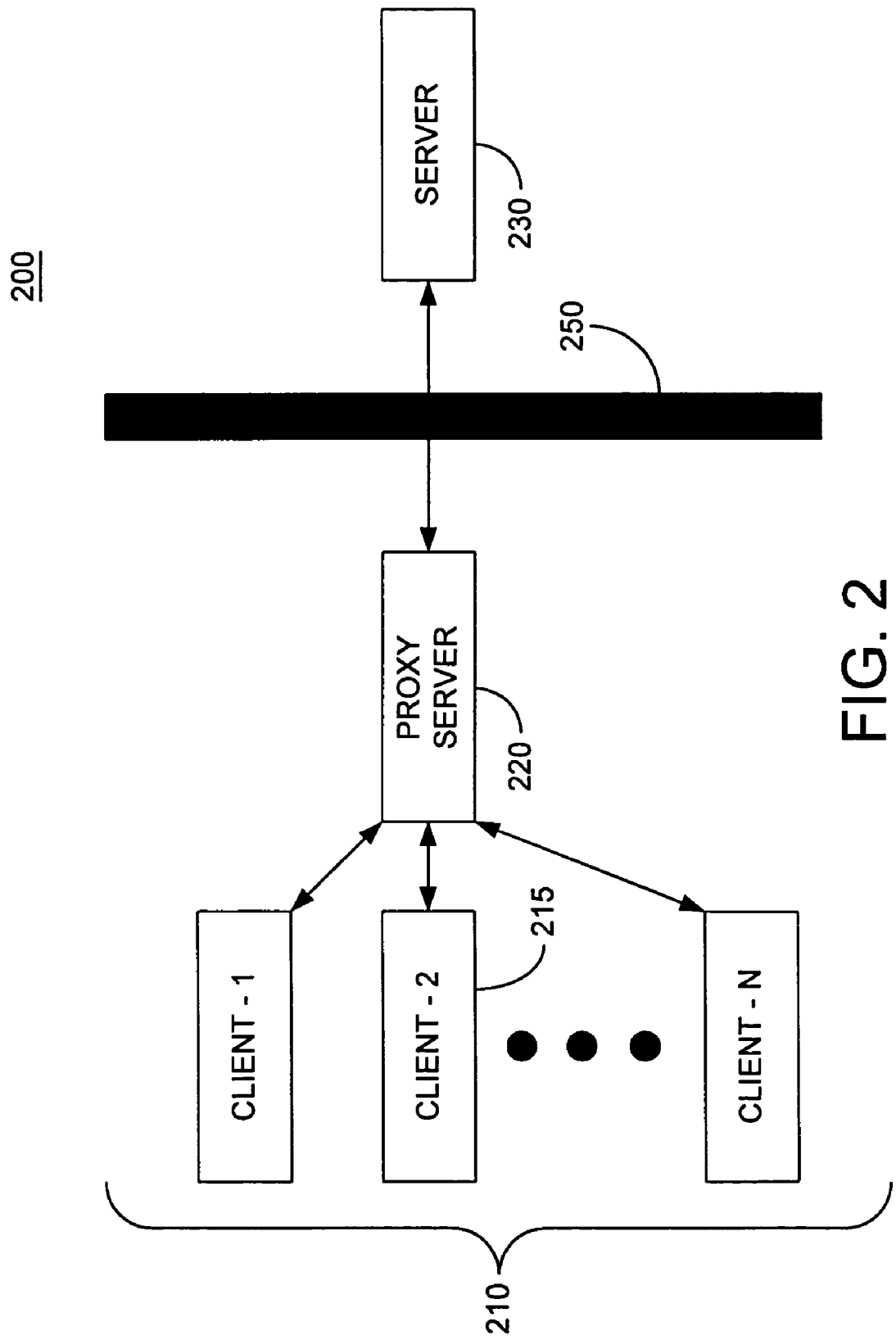
FIG. 2 is a block diagram of an exemplary network architecture for implementing a method of communicating between a plurality of clients located within a secure network and a server located outside the secure network, in accordance with one embodiment of the present invention.

FIG. 2 is a block diagram illustrating a network architecture 200 that is capable of providing for communication between a server 230 and a plurality of clients 210 through a firewall 250, in accordance with one embodiment of the present invention. The plurality of clients 210 and the server 230 are able to transfer message traffic and information through a client/server protocol implemented through the application layer (level 7 of the International Organization for Standardization Open Systems Interconnection (ISO/OSI) reference model) of the network 200. A proxy server 220 bridges the gap due to the firewall between the plurality of clients 210, including client-2 215, and the server 230.

In the present embodiment, the proxy server is able to allow the plurality of clients 210 to communicate with the server 230 through the proxy server 220 even though the client/server protocol, as developed, may be unable to recognize the presence of any proxy server that enables communication, or is unable to recognize either the plurality of clients 210 or the server 230.

Although the present embodiment discusses a proxy server providing for communication between a plurality of clients and a server through a firewall 250, other embodiments are well suited to any architecture setup wherein a first device cannot communicate directly with a second device. For example, in the case where a protocol is hard compiled to use a specific server machine for service, but that server machine is continually busy, a proxy server of the present invention can facilitate communication between the two devices. Additionally, in another example, a proxy server of the present invention can be implemented to facilitate the forwarding of e-mail directed to a home or office computer to a mobile cell phone through the cell phones network, where the e-mail network may not recognize the mobile phone network in its e-mail protocol. The advantage of using a proxy server in this situation over a receive, store, and forward process is increased speed and the ability to respond in real-time to messages.

Moreover, although the present embodiment discusses the function of a proxy server linking a plurality of clients with a server, other embodiments are well suited to the use of a proxy server to enable communication between any two devices that are unable to communicate with each other via an application layer protocol because of non-recognition of machine specific information from either of the two devices. For example, a proxy server 220 with capabilities of the present invention can be utilized to link two peer devices that communicate in a peer-to-peer architecture.

Figure 3:
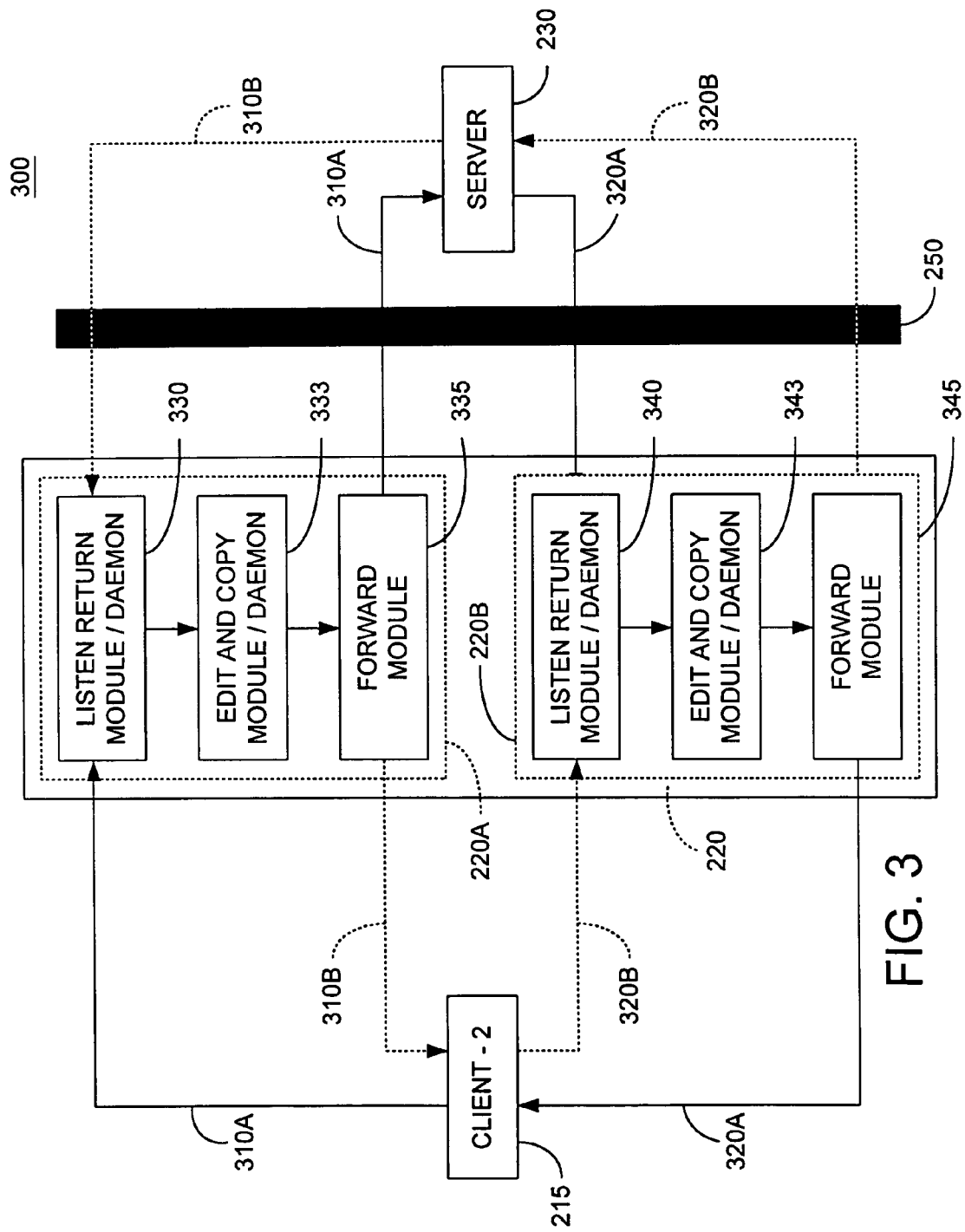
FIG. 3 is a data flow diagram of message traffic between a client and a server through an exemplary proxy server, in accordance with one embodiment of the present invention.
Figure 4:
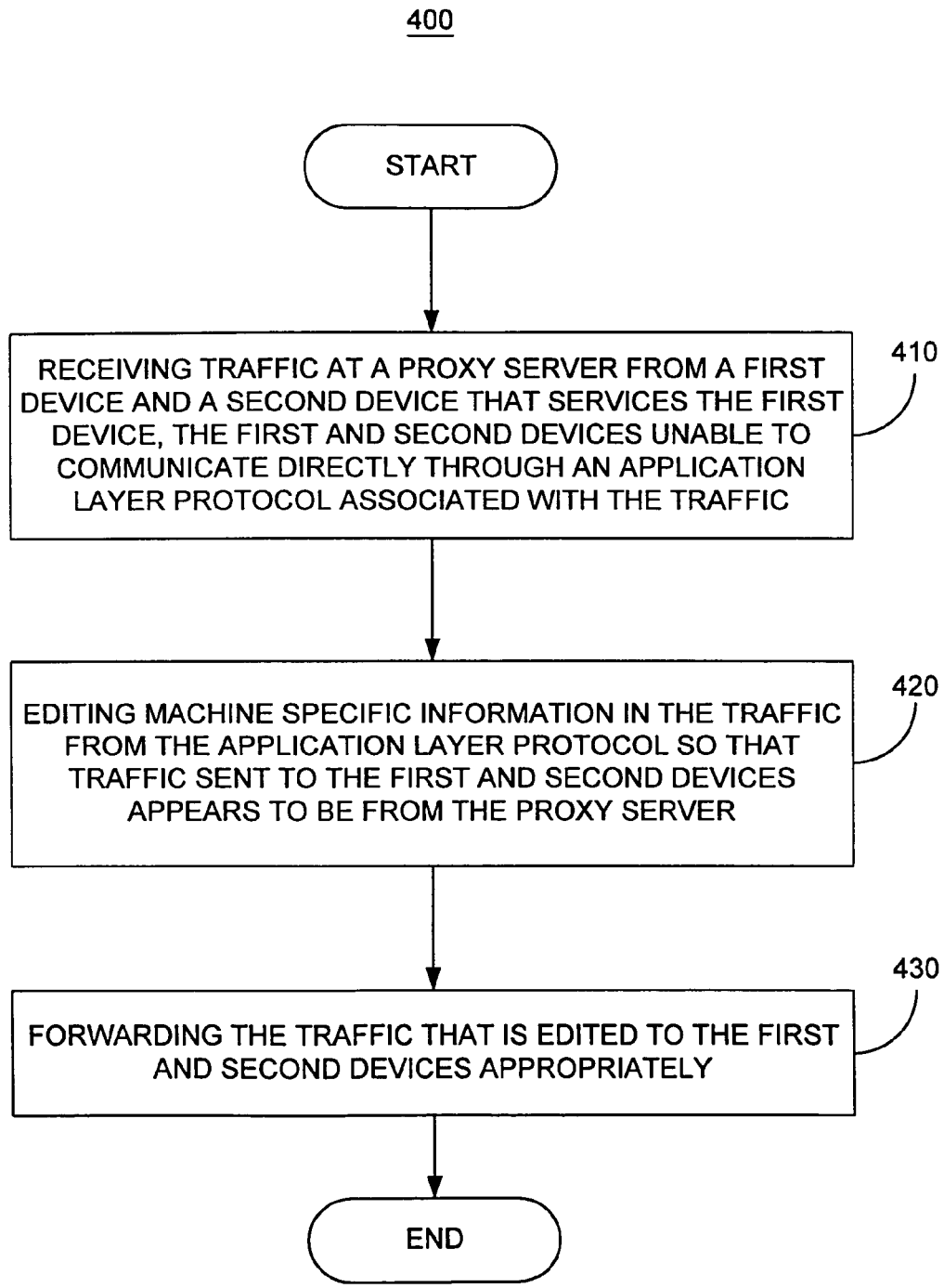
FIG. 4 is a flow diagram illustrating steps in a method that allows for communication through an exemplary proxy server between two devices that are unable to communicate directly via an application level protocol, in accordance with one embodiment of the present invention.

FIGS. 3 and 4 combine to illustrate the method and system for allowing for communication between a client device and a server that are unable to communicate directly via an application layer client/server protocol. FIG. 3 is a data flow diagram of message traffic between the server 230 of FIG. 2 and the client-2 215, also of FIG. 2, in accordance with one embodiment of the present invention. FIG. 4 is a flow chart 400 illustrating steps in a general method for communication that is implemented by the proxy server of FIG. 3.

Turning now to FIG. 3, a firewall 250 separates the client-2 215 from the server 230 such that the client-2 cannot directly communicate with the server 230. FIG. 3 is a block diagram of the proxy server 220 illustrating the flow of message traffic through the various components of the proxy server 220 from the client-2 215 and the server 230.

The proxy server 220 provides for communication between the client-2 215 and the server 220 via the client/server protocol over two ports (e.g., port 1756 and port 6000). The proxy server, in one embodiment, establishes separate modules for each of the ports to facilitate the communication as illustrated in blocks 220A and 220B for the proxy server 220. For example, port 1756 is associated with block 220A of the proxy server 220, and a port 6000 (port 6000 of the X Windows Protocol manages the display on a workstation) is associated with block 220B of the proxy server 220.

Although the present embodiment is described using two ports, other embodiments are well suited to the use of additional and other ports for communication between the client-2 215 and the server 230.

In another embodiment, it is understood that the proxy server 220 as shown in FIG. 3 is able to provide for communication between the plurality of clients 210 and the server 230 of FIG. 2 via an application layer protocol. This is accomplished while continuing to use the current application layer protocol that provides for a communication platform between the plurality of clients 210 and the server 230.

In one embodiment, the client device is configured to communicate directly with the proxy server via the client/server protocol. The client/server protocol is able to recognize the proxy server without altering the client/server protocol. For example, the proxy server can be placed within the network to ensure that machine specific information relating to the proxy server is recognizable by the client/server protocol. In addition, the proxy server is configured to recognize that communication from the client device is actually directed to the server device through the proxy server via the client/server protocol.

In FIG. 3, the proxy server 220 comprises a listen module for each of the ports capturing traffic from the client-2 215 and the server 230, in accordance with one embodiment of the present invention. For example, the listen module 330 is set up to listen for traffic over port 1756 from either the client-2 215 or the server 230. Correspondingly, the listen module 340 is set up to listen for traffic over port 6000 from either the client-2 215 or the server 230.

The proxy server 220 further comprises an edit module for each of the ports capturing traffic from the client-2 215 and the server 230 that is capable of locating and editing machine specific information referencing the client-2 215 and the server 230 in the message traffic. In this way, traffic sent to the client-2 215 and the server 230 appears to be from the proxy server 220 after editing. In addition, the proxy server 220 comprises a copy module for each of the ports capturing traffic from the client-2 215 and the server 230. The copy module creates the traffic that is edited by copying the message traffic coming into the proxy server and substituting the machine specific information for the proxy server into the message traffic, as will be discussed further below. For example, in FIG. 3, the edit and copy modules are combined so that the edit/copy module 333 is set up to edit and copy traffic over port 1756 from either the client-2 215 or the server 230. Correspondingly, the edit/copy module 343 is set up to edit and copy traffic over port 6000 from either the client-2 215 or the server 230.

Moreover, the proxy server 220 comprises a forward module for each of the ports capturing traffic from the client-2 215 and the server 230 that is capable of forwarding the message traffic that is edited to client-2 215 and the server 230 appropriately. For example, the forward module 335 is set up to forward traffic to the server 230, and the forward module 345 is set up to forward traffic to the client-2 215.

In one embodiment, each of the available ports (e.g., port 1756 and port 6000) that are used for communication between client-2 215 and the server 230 is capable of bi-directional communication. For example, for port 1756, communication from the client-2 215 to the server 230 through block 220A is illustrated by line 310A. Communication returning from the server 230 back to the client-2 215 through block 220A is illustrated by line 310B. Correspondingly, for port 6000, communication from the server 230 to the client-2 215 through block 220B is illustrated by line 320A. Communication returning from the client-2 215 back to the server 230 through block 220B is illustrated by line 320B. As such, there may be up to four separate edit/copy processes per client (e.g., client-2 215) over both ports 1756 and 6000. If communication over port 6000 is not required, then there would be two separate edit/copy processes for client-2 215 for each direction over port 1756.

In addition, in another embodiment, for each port there are separate edit and copy modules performed in daemon programs for each direction the communication travels. As such, two separate edit and copy modules 333 are created for each of the directions of communication over port 1756 between the server 230 and the client-2 215 as illustrated by lines 310A and 310B. Correspondingly, two separate edit and copy modules 343 are created for each of the directions of communication over port 2000 between the server 230 and the client-2 215 as illustrated by lines 320A and 320B.

Looking now at the data flow of communication through the proxy server 220 over port 1756, implementation of the various modules in the proxy server 220 can be illustrated. For example, FIG. 3 illustrates a communication path illustrated by line 310A that is established to transfer message traffic from the client-2 215 through the proxy server 220 to the server 230. Alternatively, FIG. 3 also illustrates a communication path illustrated by line 310B that is established to transfer message traffic from the server 230 through the proxy server 220 to the client-2 215. In both cases, data in the message traffic flows from the client-2 215 or the server 230 to the listen module 330. The listen module 330 is implemented in a daemon program that continually loops to listen for message traffic from client-2 215 or the server 230 over a single port (e.g., port 1756 on the proxy server).

After the listen module 330 picks up message traffic, edit and copy daemons are invoked in the edit and copy module 333. As discussed previously, separate edit and copy daemons are established for each direction of communication, in one embodiment. In another implementation, the edit and copy modules are combined, while in other embodiments, the edit and copy modules are independent of each other. As such, data flows from the listen module 330 to the edit and copy module 333. The edit and copy daemons in the edit and copy module 333 are able to locate machine specific information in the message traffic and substitute machine specific information for the proxy server 220 into the message traffic.

Thereafter, data flows from the edit and copy module 333 to the forward module 335. The forward module 335 forwards the message traffic to the server 230 as illustrated by line 310A over a communication channel that is able to pass through the security measures of the firewall 250. As such, the communication path from the client-2 215 to the server 230 as illustrated by line 310A is completed through implementation of the block 220A in the proxy server 220. Additionally the forward module 335 forwards the message traffic to the client-2 215 as illustrated by line 310B. As such, the communication path from the server 230 to the client-2 215 is completed through implementation of the block 220A in the proxy server 220.

FIG. 3 also illustrates a communication path illustrated by line 320A that is established to transfer message traffic from the server 230 to the client-2 215 through the proxy server 220 over port 6000, in accordance with one embodiment of the present invention. This is necessary should the client-2 ask the server 230 for information that requires communication over an X-window port. Alternatively, FIG. 3 also illustrates a communication path illustrated by line 320B that is established to transfer message traffic from the client-2 215 through block 220B of the proxy serer to the server 230 bi-directionally over port 6000. Through port 6000, data in the message traffic flows from the server 230 or the client-2 215 to the listen module 340. The listen module 340 is implemented in a daemon program that continually loops to listen for message traffic from server 230 or the client-2 215 over a single port (e.g., port 6000).

After the listen module 340 picks up message traffic from the client-2 215 or the server 230, edit and copy daemons are invoked in the edit and copy module 343. As discussed previously, in one embodiment, separate edit and copy modules are created depending on the direction of communication through the port 6000. Additionally, in one implementation, the edit and copy modules are combined, while in other embodiments, the edit and copy modules are independent of each other. As such, data flows from the listen module 340 to the edit and copy module 343. The edit and copy daemons in the edit and copy module 343 are able to locate machine specific information in the message traffic and substitute machine specific information for the proxy server 220 into the message traffic.

Thereafter, data flows from the edit and copy module 343 to the forward module 345. The forward module 345 forwards the message traffic to the client-2 215 over a communication channel as illustrated by line 320A. As such, the communication path as illustrated by line 320A from the server 230 to the client-2 215 is completed through implementation of the proxy server 220. Additionally, the forward module 345 forwards the message traffic to the server 230 over a communication channel as illustrated by line 320B. As such, the communication path as illustrated by line 320B from the client 2-215 to the server is completed through implementation of the proxy server 220.

In one embodiment, each of the functions in the modules of the proxy server 220 is implemented in a daemon routine or process. Daemons typically run in the background indefinitely and wait for an event or period when they are invoked to perform some task.

FIG. 4 is a flow chart 400 illustrating steps in a general method for communication that is implemented by the proxy server of FIG. 3. The method of FIG. 4 can be accomplished without altering or modifying the application layer client/server protocol that provides for communication between the two devices, in accordance with one embodiment of the present invention.

The functions of the various modules of the proxy server 220 are illustrated in flow chart 400, in accordance with one embodiment of the present invention. For example, the functions provided for in the listen modules 330 and 340 are illustrated in step 410. As such, the present embodiment receives traffic at a proxy server from a first device (e.g., client-2 215) and a second device (e.g., server 230), in step 410. The second device services the first device, such as, storing information, or running a program, and providing the information or the output to the program to the first device. An application layer protocol associated with the traffic provides a medium for communication between the first and second devices however, the first and second devices are unable to communicate directly via the protocol because of a firewall, or the protocol is unable to recognize either the first or second device.

Moreover, the functions of the edit and copy modules 333 and 343 of FIG. 3 are illustrated in step 420 of flow chart 400. The present embodiment edits machine specific information in the traffic received at the proxy server so that traffic sent to the first and second devices appear to be sent from the proxy server.

Additionally, the function of the forward module is illustrated in step 430 of flow chart 400. The present embodiment forwards the traffic that is edited such that message traffic appears to be from the proxy server, and forward to the first and second devices appropriately.

In another embodiment, the flow chart 400 is applicable to a network where a plurality of clients is serviced by a server via an application layer client/server protocol. As illustrated in flow chart 400, the present embodiment receives traffic at a proxy server from a plurality of clients and the server in step 410. In one example, the plurality of clients and the proxy server are located within a secure network protected by a firewall, and the server is located outside the secure network. The plurality of clients are unable to communicate directly with the server via the client/server protocol associated with said traffic.

In addition, in step 420, the present embodiment then edits machine specific information in the traffic so that traffic sent to the plurality of clients and the server appears to be from the proxy server. Thereafter, the present embodiment forwards the traffic that is edited to the plurality of clients and the server appropriately.

In one embodiment, the method provided for in flow chart 400 is performed automatically, and on-the-fly. As such, message traffic sent to one device can be seamlessly forwarded to another device. For example, instant messaging traffic sent to one device can be automatically sent to a proxy server for editing and then sent to a mobile cell phone at a different location. Initially, the protocol providing for the instant messaging may not recognize machine specific information referencing the mobile cell phone. However, with the implementation of the proxy server, the message traffic can be sent to the proxy server for editing and then forwarding of the edited message to the cell phone.

In one embodiment, the method illustrated in FIG. 4 establishes a communication channel between the first device and the proxy server. The present embodiment establishes the communication channel in response to a request from the first device for the purposes of transferring the traffic between the first device and the second device. In relation to FIG. 3, the request invokes the listen daemon 330.

Once the request is received by the proxy server, the proxy server understands that the first device actually wants to communicate with the second device (e.g., a proxy server that is outside a firewall), and as such, the present embodiment establishes a second communication channel between the proxy server and the second device. The first and second communication channels are established following a Transmission Control Protocol/Internet Protocol (TCP/IP) standard. Thereafter, message traffic between the first and second devices is received through the first and second communication channels that are established.

The following Table 1 discloses an exemplary Perl Script program that implements the functionality of flow chart 400 to provide for communication between a plurality of client devices and a server device that services the plurality of clients via an application layer client/server protocol.

TABLE 1

Pseudocode

----
Globals

$AF_INET=2;
$SOCK_STREAM=1;
$tcp=(getprotobyname('tcp'))[2];
$SOL_SOCKET=0xffff;
$SO_REUSEADDR=4;

TABLE 1-continued

Pseudocode

```
$SOMAXCONN=20;
$IPC__PRIVATE=0;
($subpat=$atm__server)=~s/([\.\-])/\\$1/g;        # ATM server pattern
# ---------------------------------------------------------
# pack_addr

sub pack__addr
{
    my ($m,$p)=@_;                                # a4 avoids a unpack/pack('N'...
    return pack('Sna4x8',$AF__INET,$p,(gethostbyname($m))[4]);
}
# ---------------------------------------------------------
# unpack__addr

sub unpack__addr
{
    my ($adr)=@_;
    my ($p,$ia);
    ($p,$ia)=unpack('x2nNx8',$adr);
    return ($ia,$p);
}
# ---------------------------------------------------------
# TCP Copy Daemon

sub copy
{
    my ($fm,$fmnam,$to,$dir,$atm)=@_;
    my ($ein,$eo,$flags,$msg,$msg2,$rin,$ro,$rV);
    $flags=fcntl($fm,3,0) or die "Can't get flags for $fmnam:
        $!\n";
    fcntl($fm,4,$flags|4) or die "Can't set flags for $fmnam:
        $!\n";
    $rin=''; vec($rin,fileno($fm),1)=1; $ein=$rin;
    while () {
        select($ro=$rin,undef,$eo=$ein,undef);
        if ($rv=sysread($fm,$msg,16384,0)) {
            ($msg2=$msg)=~s/$subpat/$proxy__mach/g;       #
                                    Modify data stream
            print $to $msg2;
            if (length($msg)>50) { $msg=substr($msg,0,50); }
            print "$dir: $msg\n";
            if ($atm)
                { shmwrite $lastIP,$atm,0,128; }
            }
        elsif ($rv==0)
            { last; }
        else
            { print "$dir input error: $!\n"; last; }
        }
    shutdown $fm,0; shutdown $to, 1;
    print "$dir closed\n";
    return;
}
# ---------------------------------------------------------
# TCP Listen Daemon

sub listen_daemon
{
    my ($lport,$mach,$fport)=@_;
    my ($cli,$client,$fmIP,$pid,$prid,$server,$t);
    ($t=$mach)=~s/\. . . *$//; $lmf=($t? "$lport->$t:$fport":$lport);
    if ($pid=fork)                      # Fork &
        { return; }                     # parent returns
    if (!defined $pid)
        { print "ERROR, $lmf couldn't fork: $!\n"; return; }
    setpgrp;
    print "NOTE: $lmf started . . . \n";
    if (!socket(LISTEN,$AF__INET,$SOCK__STREAM,$tcp))
                                        # Open & listen on sock
        { print "ERROR, $lmf can't open LISTEN socket: $!\n";
            exit 0; }
    if (!setsockopt(LISTEN,$SOL__SOCKET,$SO__REUSEADDR,1))
        { print "ERROR, $lmf can't setsockopt SO__REUSEADDR:
            $!\n"; exit 0; }
    if (!bind(LISTEN,&pack__addr($host,$lport)))
        { print "ERROR, $lmf can't bind to $host:$lport: $!\n";
            exit 0; }
```

TABLE 1-continued

Pseudocode

```
    if (!listen(LISTEN,$SOMAXCONN))
        { print "ERROR, $lmf can't listen: $!\n"; exit 0; }
    if (!$mach) {
        shmread $lastIP,$mach,0,128;
            $server=&pack__addr($mach,6000);
        srv=sprintf("%d.%d.%d.%d:%d",(unpack('x2nC4x8',$server
            ))[1 . . . 4,0]);
        }
    else
        { $server=&pack__addr($mach,$fport); $srv="$mach:$fport";
        }
    while () {
        unless ($client=accept(CLIENT,LISTEN))
            { print "ERROR, $lmf accept failed: $!\n"; next; }
        $cli=sprintf("%d.%d.%d.%d:%d",(unpack('x2nC4x8',$client))
            [1 . . . 4,0]);
        print "NOTE $lmf: $cli connect.\n";
        select CLIENT; $|=1; select STDOUT;
        if ($prid=fork)
            { close CLIENT; next; }        # Listen daemon loops
        close LISTEN;                      # Copy daemon
        if (!socket(SERVER,$AF__INET,$SOCK__STREAM,$tcp))
            { print "ERROR, $lmf ($cli) can't open server socket:
                $!\n"; exit 0; }
        if (!connect(SERVER,$server))
            { print "ERROR, $lmf $cli failed to connect to $srv:
                $!\n"; exit 0; }
        select SERVER; $|=1; select STDOUT;
        if ($prid=fork)
            { ©('SERVER',$srv,'CLIENT',"$cli s->c",0); exit 0;
            }
        if ($fmIP=(($lport==1756)?$cli:0))
            { $fmIP=~s/\:.*$//; }
        ©('CLIENT',$srv,'SERVER',"$cli c->s",$fmIP);
        exit 0;
        }
}
# ---------------------------------------------------------
# Port Forwarder

($me=$0)=~s-.^.*/--;
if ($#ARGV!=-1)
    { die "Usage: $me\n"; }
undef %ENV;
chop ($host='/usr/bin/hostname');           # pf hostname
if ($host=~/^([\w\-\.]+)$/)
    { $host=$1; }
else
    { die "$me ERROR, bad hostname output: $host\n"; }
close STDIN; open(STDIN,"</dev/null");
                                            # Begin daemonizing
close STDOUT; open(STDOUT,">/tmp/pf$$.log");
close STDERR; open(STDERR,">&1");
select STDERR; $|=1; select STDOUT; $|=1;
$SIG{CHLD}='IGNORE';                        # Parent need not wait
if (!defined ($lastIP=shmget($IPC__PRIVATE,128,0700)))
    { die "$me ERROR, can't get shared memory: $!\n"; }
&listen__daemon(6000,'',6000);              # ATM Reports X port
&listen__daemon(1756,$atm__server,1756);
                                            # ATM server name
exit 0;
```

Figure 5:
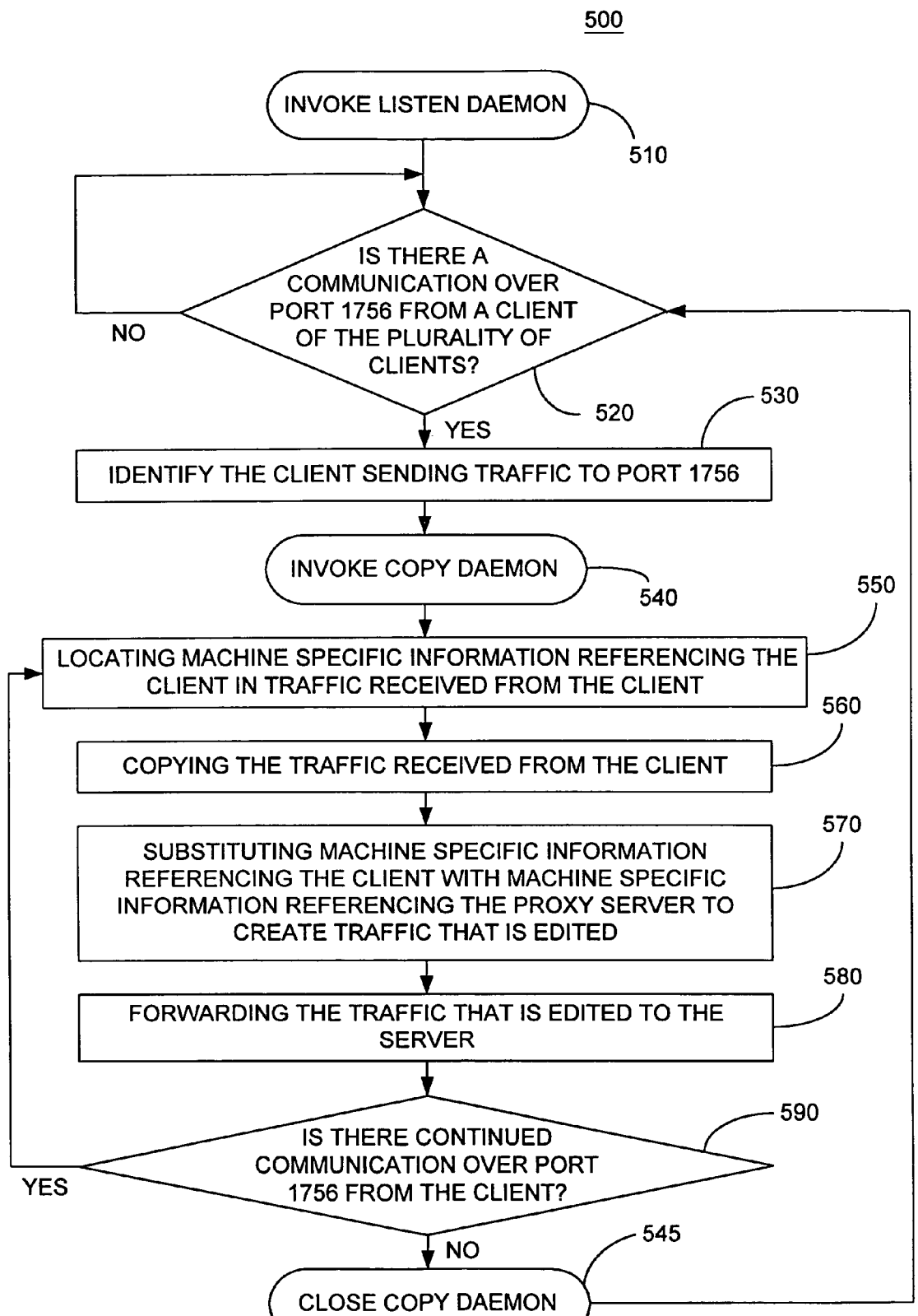
FIG. 5 is a flow diagram illustrating steps in a method that allows for communication through an exemplary proxy server from a client to a server, where the client and the server are unable to communicate directly via an application level protocol, in accordance with one embodiment of the present invention.
Figure 7:
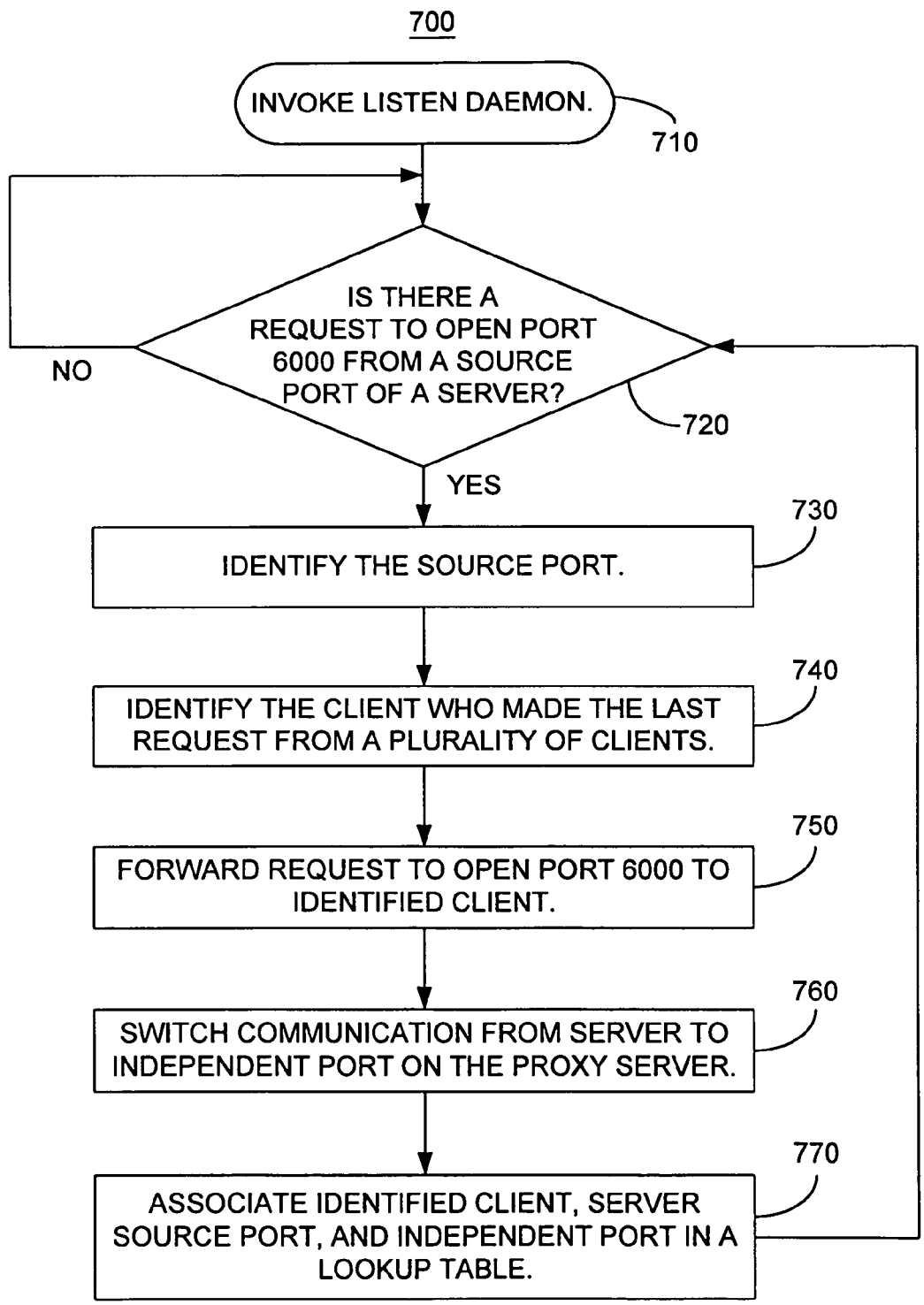
FIG. 7 is a flow diagram illustrating steps in a method that allows for communication through an exemplary proxy server from a server to a client, where the client and the server are unable to communicate directly via an application level protocol, in accordance with one embodiment of the present invention.

The particular implementation of steps 420 and 430 of flow chart 400 can be illustrated in the flow charts 500 and 700 of FIGS. 5 and 7. Flow chart 500 illustrates steps in a method for forwarding message traffic from a client to a server through a proxy server. Flow chart 700 illustrates steps in a method for forwarding message traffic from the server to the client through the proxy server.

Now turning to FIG. 5, flow chart 500 illustrates steps in a method for forwarding message traffic from a client to a server through a proxy server that edits machine specific information from the message traffic to make it appear to the server that the message traffic is being sent from the proxy server, in accordance with one embodiment of the present invention.

The present embodiment begins by invoking the listen daemon in step 510. The listen daemon is illustrated by the listen module 330 of FIG. 3. The listen daemon continually waits in a loop until there is communication from the client device to the proxy server, as is illustrated in decision step 520.

In decision step 520, the present embodiment determines whether there is communication from the client over port 1756, in one embodiment. Other embodiments determine whether there is communication from the client over other defined ports at the proxy server. If there is no communication, the method in flow chart 500 loops back to the beginning of decision step 520 continuously until there is communication.

When communication is detected from the client, the present embodiment identifies the client that is sending the message traffic to port 1756 at the proxy server. This can be done by examining TCP/IP header information in the packets of the message traffic.

Once the client is identified by the proxy server, the proxy server can establish TCP/IP communication channels both with the identified client and the server, as previously discussed. Thereafter, the proxy server can begin the process of forwarding the message traffic to the server over those established communication channels.

In step 540, the copy daemon is invoked once the client is identified. A separate copy daemon is invoked for each client that is trying to send message traffic to the server through the proxy server. In that way, multiple clients can communicate with the server simultaneously. In one embodiment, to provide for simultaneous servicing, the functions of the proxy server are duplicated in multiple central processing units to allow for multiplexing communication from the various clients in the plurality of clients that are serviced by the server.

In the copy daemon, the present embodiment locates machine specific information that references the identified client in the message traffic that was received from the identified client, in step 550. The machine specific information can be any identifier that is used in the client/server protocol to identify end users. For example, the machine specific information can include, but is not limited to, machine names, domain names, time zone assumptions, TCP/IP addresses, etc.

In step 560, the present embodiment copies the message traffic that is received from the client. As such, the message traffic that is copied can be edited to reflect origination from the proxy server. In other embodiments, the editing occurs before the copying step, depending on design preferences.

In step 570, the message traffic is edited by the present embodiment. The proxy server substitutes the machine specific information that previously referenced the identified client with machine specific information that now references the proxy server. In this way, the message traffic appears to the server to be coming from the proxy server instead of the identified client. As such, after the copying and editing steps 560 and 570, the message traffic that is edited is created.

In a similar fashion, message traffic that comes from the server to the proxy server that is directed to the identified client is also edited at the application layer, in one embodiment. For instance, the proxy server locates machine specific information referencing the server in traffic received from said server. This can be over any port, as long as the proxy server understands that the message traffic is coming from the server and needs to be forwarded to one of the plurality of clients.

The present embodiment also creates the message traffic that is edited by copying the traffic received from the server. Thereafter, the present embodiment substitutes machine specific information that references the server with machine specific information referencing the proxy server. As such, the present embodiment creates the message traffic that is edited from the server, and can forward the message traffic that is edited to the proper client.

In step 580, the present embodiment forwards the message traffic to the server over the previously created TCP/IP communication channel. The copy daemon that is specific to the client remains open until all related message traffic from the identified client to the server has been transmitted, as is illustrated in steps 590 and 545.

In decision step 590, the present embodiment determines whether there is continued communication from the identified client over port 1756, the port identified for incoming requests from the plurality of clients. If there are continued requests and message traffic, then the copy daemon specific to the identified client remains open and receives, edits, and forwards the continuing message traffic from the identified client.

On the other hand, if there is no more related communication over port 1756 from the client to the server, then the present embodiment closes the copy daemon specific to the identified client, and returns to decision step 520 to listen for other communication from the plurality of clients.

Correspondingly, flow chart 700 of FIG. 7 illustrates steps in a method for forwarding message traffic from the server back to the client through the proxy server, such that, after editing, the message traffic again appears to the client to be sent from the proxy server, in accordance with another embodiment of the present invention.

Figure 6:
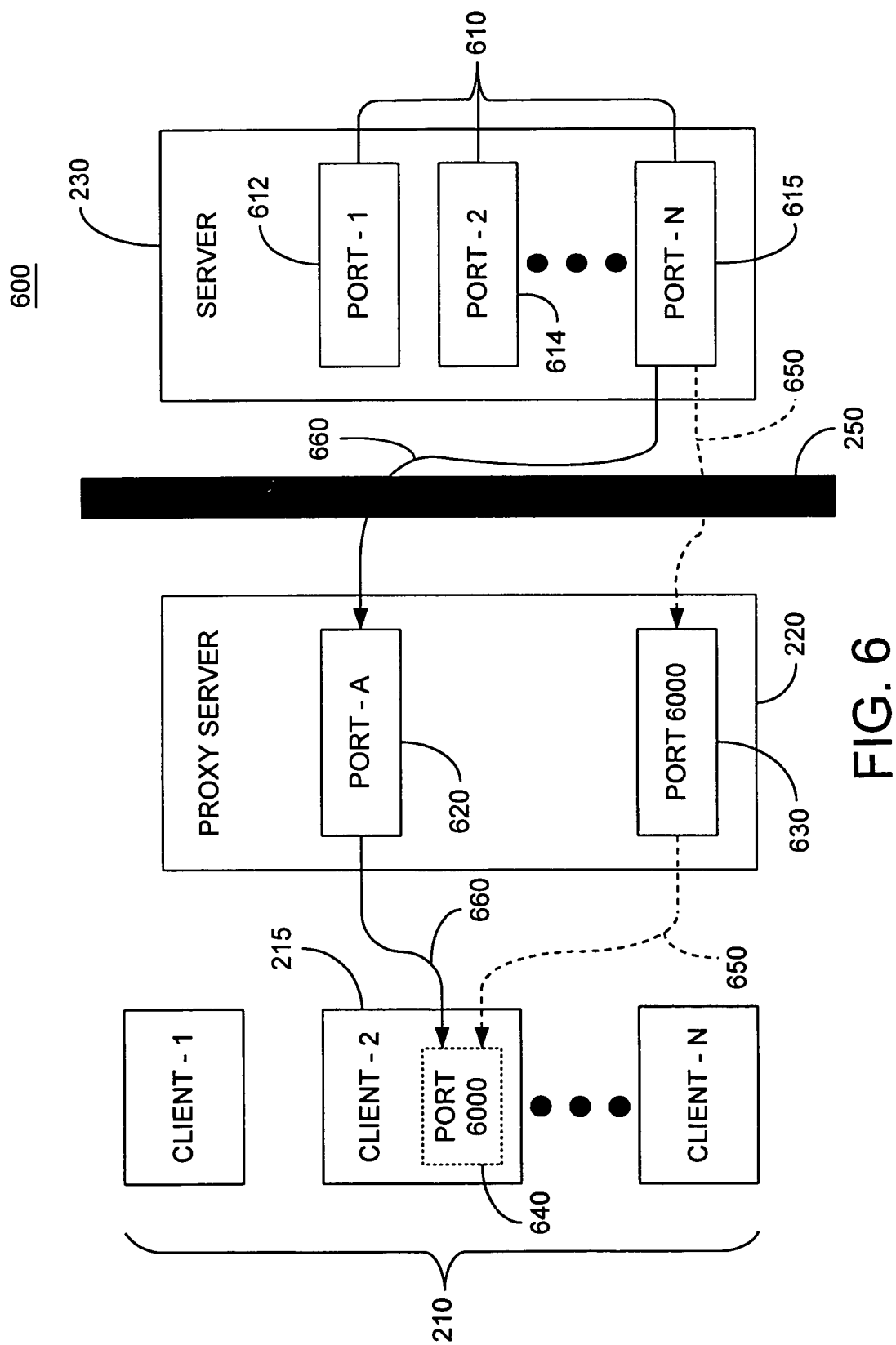
FIG. 6 is a data flow diagram of message traffic coming from a server through port 6000 of an exemplary proxy server, in accordance with one embodiment of the present invention.

The flow chart 700 can be understood in conjunction with the data flow diagram 600 of FIG. 6. In FIG. 6, the network architecture is similar to the network 200 of FIG. 2. A plurality of clients 210 and a proxy server 220 is located within a secure network that is protected by a firewall 250. A server 230 that provides service to the plurality of clients 210 is located on the outside of the firewall 250. The server 230 is comprised of a plurality of source ports 610 including port-1 612, port-2 614, on up to port-N 615. The proxy server 220 comprises a plurality of communication ports including port-A 620 and an X Window port, port 6000, 630. Each of the clients also comprise an X Window port, port 6000. For example, client-2 215 comprises a port 6000 640.

Returning to flow chart 700, the present embodiment begins by invoking a listen daemon in step 710. The listen daemon is illustrated by the listen module 340 of FIG. 3. The listen daemon continually waits in a loop until there is communication from the client device to the proxy server, as is illustrated in decision step 720.

In decision step 720, the present embodiment receives a reply from a source port that is associated with server at the proxy server, and determines whether there is a request to open a port 6000 located on the proxy server. Referring now to FIG. 6, this reply to open the port 6000 in the proxy server is in response to one of a plurality of requests that are coming from the plurality of clients (e.g., plurality of clients 210) for the transfer of information from the server (e.g., server 230).

In step 730, the present embodiment identifies the source port. This is necessary, since the server may open any number of source ports to reply to a plurality of requests coming from the plurality of clients 210 of FIG. 6. As such, the proxy server can associate a particular source port with a particular client for continued communication between those two devices. For example, in FIG. 6, the source port making the reply is port-N 615 that communicates over communication channel 650 to the port 6000 630 of the proxy server.

In step 740, the present embodiment identifies the client, an identified client, from the plurality of clients who made the latest request to the proxy server. In this heuristic implementation, it is assumed that the response from the server is fast enough that no other request from any other client will have entered the proxy server. As such, a one to one association can be made between the source port in the server and the client that made the last request. In the present example, it is assumed that client-2 215 has made the latest request, and no other clients have made a request to the proxy server before a reply from the server has been made in response to the request from client-2 215.

In step 750, the present embodiment forwards the reply to the identified client who made the last request, as is shown by path 650 that continues from the proxy server 630 to port 6000 640 of the identified client (e.g., client-2 615) in FIG. 2. In this manner, the identified client will open its own port 6000 (e.g., port 6000 640 of client-2 215) for further communication between the server and the identified client.

Since the proxy server is enabling communication between the server and a plurality of clients 210, the port 6000 cannot be monopolized by one series of communication between the identified client and the server. The port 6000 cannot handle multiple client transactions. As such, the present embodiment switches the message traffic coming from the server from port-N 615 that is directed to the identified client over to an independent port, such as, port-A 620. This is shown in path 660 that comes from the port-N 615 of server 230 to the port-A 620 of the proxy server. In this way, further related communication between the server through port-N and the identified client, client-2 215, can be continued through port-A 620 instead of port 6000. This allows port 6000 to handle another reply to a different client in the plurality of clients.

In step 770, the present embodiment associates the identified client (e.g., client-2 215), the server source port 615, an the independent port (e.g., port-A 620) in the proxy server 220 together in a look up table. As such, the proxy server understands to forward further communication that enters port-A 620 to client-2 215 by referencing the lookup table. In this way, multiple communications can occur between the server and the plurality of clients 210.

The preferred embodiments of the present invention, a method and system for communication between two devices unable to communicate directly via an application layer protocol by implementing a proxy server, is thus described. While the present invention has been described in particular embodiments, it should be appreciated that the present invention should not be construed as limited by such embodiments, but rather construed according to the below claims.

What is claimed is:

1. A method for communicating comprising:
receiving traffic at a proxy server from a first device and a second device that services said first device, wherein said proxy server acts as a communications relay between said first device and said second device, and wherein said traffic comprises first machine specific information specific to said first device and second machine specific information specific to said second device that if left unedited prevents said proxy server from facilitating communication between said first device and said second device, wherein said first machine specific information comprises an address of said first device;
editing said first machine specific information including said address at the ISO/OSI application layer so that traffic from said first device sent to said second device appears to originate from said proxy server, said traffic complying with a protocol operating at said application layer;
wherein said editing comprises:
locating machine specific information including said address referencing said first device in traffic received from said first device;
creating said traffic that is edited, said creating comprising:
copying said traffic received from said first device; and
substituting said machine specific information including said address referencing said first device with machine specific information referencing said proxy server in said traffic received from said first device;
locating machine specific information referencing said second device in traffic received from said second device; and
creating said traffic that is edited, said creating comprising:
copying said traffic received from said second device; and
substituting said machine specific information referencing said second device with machine specific information referencing said proxy server in said traffic received from said second device;
forwarding said traffic that is edited from said first device to said second device to enable communication between said first device and said second device; and
forwarding said traffic that is edited from said second device to said first device to enable communication between said second device and said first device.

2. The method as described in claim 1, further comprising:
before said receiving, configuring said first device to communicate with said proxy server instead of said second device, said proxy server able to communicate with said first and second devices.

3. The method as described in claim 1, wherein said receiving further comprises:
establishing a first communication channel between said first device and said proxy server in response to a request from said first device for the purposes of transferring said traffic between said first device and said second device;
establishing a second communication channel between said proxy server and said second device; and
receiving said traffic at said proxy server from said first and second devices over said first and second communication channels.

4. The method as described in claim 1, wherein said first and second communication channels are established following a Transmission Control Protocol/Internet Protocol (TCP/IP) standard.

5. The method as described in claim 1, wherein said proxy server and a plurality of clients including said first device are located within a secure network protected by a firewall, and said second device is located outside said secure network, said second device servicing said plurality of clients via said protocol operating at said application layer.

6. The method as described in claim 5, further comprising:
receiving a reply from a source port associated with said second device at said proxy server to open a first port 6000 in response to one of a plurality of requests from said plurality of clients;

forwarding said reply to a first client that sent a most recent request to said proxy server to open a second port 6000 for communication;

switching communication from said second device source port to said first port 6000 to an assigned port at said proxy server; and forwarding further communication from said second device source port to said assigned proxy server port to said second port 6000 on said first client.

7. The method as described in claim 1, wherein said first machine specific information further comprises a machine name.

8. The method as described in claim 1, wherein said address complies with an Internet Protocol (IP).

9. A method for communicating comprising:

receiving traffic at a proxy server from a plurality of clients and from a second server servicing said plurality of clients, said plurality of clients and said proxy server located within a secure network protected by a firewall, said second server located outside said secure network, said proxy server acts as a communications relay between said plurality of clients and said second server, and wherein said traffic comprises machine specific information associated respectively with each of said clients and said second server that if left unedited prevents said proxy server from facilitating communication between said plurality of clients and said second server, wherein first machine specific information specific to a first client of sail plurality of clients comprises a source address for said first client;

editing said first machine specific information including said source address at the ISO/OSI application layer so that traffic from said first client sent to said second server appears to originate from said proxy server, said traffic complying with a protocol operating at said application layer wherein said editing further comprises:

locating machine specific information referencing said source in said message;

creating said traffic that is edited, said creating comprising:

copying said message; and substituting said machine specific information referencing said source with machine specific information referencing said proxy server in said message;

forwarding said traffic that is edited to said second server to enable communication between said first client and said second server;

editing second machine specific information including said source address at the ISO/OSI application layer so that traffic from said second server to said first client appears to originate from said proxy server, said traffic complying with a protocol operating at said application layer wherein said editing further comprises:

locating machine specific information referencing said source in said message;

creating said traffic that is edited, said creating comprising:

copying said message; and substituting said second machine specific information referencing said second server with machine specific information referencing said proxy server in said message; and forwarding said traffic that is edited to said first client to enable communication between said second server and said first client.

10. The method as described in claim 9, wherein said receiving further comprises:

continually listening for said traffic;

receiving a message of said traffic; and identifying a source of said message, said source comprising one of said plurality of clients and said second server.

11. The method as described in claim 9, further comprising:

receiving a reply from a source port from said second server at said proxy server to open a first port 6000 in response to one of a plurality of requests from said plurality of clients;

forwarding said reply to a client that sent a most recent request to said proxy server to open a second port 6000 at said client that sent a most recent request to said proxy server;

switching communication from said second server source port to said first port 6000 to an assigned port at said proxy server; and forwarding further communication from said second server source port to said assigned proxy server port to said second port 6000.

12. The method as described in claim 9, further comprising:

at said proxy server, understanding that traffic from said first client following said protocol is directed towards said second server.

13. The method as described in claim 9, wherein said machine specific information further comprises a domain name.

14. The method as described in claim 9, wherein said plurality of clients are unable to communicate directly with said second server through said application layer protocol.

15. A proxy server comprising:

a processor; and a computer readable memory coupled to said processor and containing program instructions that, when executed, implement a method for communicating comprising:

receiving traffic at a proxy server from a first device and a second device that services said first device, wherein said proxy server acts as a communication relay between said first device and said second device, and wherein said traffic comprises first machine specific information specific to said first device and second machine specific information specific to said second device that if left unedited prevents said proxy server from facilitating communication between said first device and said second device, wherein said first machine specific information comprises an address of said first device;

editing said first machine specific information including said address at the ISO/OSI application layer so that traffic from said first device sent to said second device appears to originate from said proxy server, said traffic complying with a protocol operating at said application layer wherein said editing in comprises locating machine specific information including said address referencing said first device in traffic received from said first device and creating said traffic that is edited, said creating comprising:

copying said traffic received from said first device; and substituting said machine specific information including said address referencing said first device with machine specific information referencing said proxy server in said traffic received from said first device wherein said editing further comprises locating machine specific information referencing said second device in traffic received from said second device and creating said traffic that is edited, said creating comprising:

copying said traffic received from said second device; and substituting said machine specific information referencing said second device with machine specific information referencing said proxy server in said traffic received from said second device; and forwarding said traffic that is edited from one of said first and said second device to the other one of said first device and said second device to enable communication between said first and said second device.

16. The proxy server as described in claim 15, wherein said method further comprises:

before said receiving, configuring said first device to communicate with said proxy server instead of said second device, said proxy server able to communicate with said first and second devices.

17. The proxy server as described in claim 15, wherein said receiving in said method further comprises:

establishing a first communication channel between said first device and said proxy server in response to a request from said first device for the purposes of transferring said traffic between said first device and said second device;

establishing a second communication channel between said proxy server and said second device; and receiving said traffic at said proxy server from said first and second devices over said first and second communication channels.

18. The proxy server as described in claim 15, wherein said first and second communication channels are established following a Transmission Control Protocol/Internet Protocol (TCP/IP) standard.

19. The proxy server as described in claim 15, wherein said proxy server and a plurality of clients including said first device are located within a secure network protected by a firewall, and said second device is located outside said secure network, said second device servicing said plurality of clients via said protocol operating at said application layer.

20. The proxy server as described in claim 19, wherein said method further comprises:

receiving a reply from a source port associated with said second device at said proxy server to open a first port 6000 in response to one of a plurality of requests from said plurality of clients;

forwarding said reply to a first client that sent a most recent request to said proxy server to open a second port 6000 for communication;

switching communication from said second device source port to said first port 6000 to an assigned port at said proxy server; and forwarding further communication from said second device source port to said assigned proxy server port to said second port 6000 on said first client.

21. The proxy server as described in claim 15, wherein said first machine specific information further comprises a machine name.

22. The proxy server as described in claim 15, wherein said address complies with an Internet Protocol (IP).

* * * * *

UNITED STATES PATENT AND TRADEMARK OFFICE
CERTIFICATE OF CORRECTION

PATENT NO. : 7,694,018 B2
APPLICATION NO. : 10/300112
DATED : April 6, 2010
INVENTOR(S) : Carl L. Wuebker It is certified that error appears in the above-identified patent and that said Letters Patent is hereby corrected as shown below:

In column 15, line 29, in Claim 9, delete "sail" and insert -- said --, therefor.

In column 16, line 65, in Claim 15, after "device" insert -- ; --, therefor.

Signed and Sealed this

Twelfth Day of October, 2010

David J. Kappos
*Director of the United States Patent and Trademark Office*